United States Patent [19]

Elberty et al.

[11] Patent Number: 6,084,512
[45] Date of Patent: Jul. 4, 2000

[54] METHOD AND APPARATUS FOR ELECTRONIC LABELING AND LOCALIZING

[75] Inventors: Thomas A. Elberty, Califon; Avi I. Hauser, Englishtown, both of N.J.; Yosef Hipsh, Kiryat-Bialik, Israel; Brian J. McHugh, Westfield; William H. Sohl, Budd Lake, both of N.J.

[73] Assignee: Lucent Technologies, Inc., Murray Hill, N.J.

[21] Appl. No.: 09/165,462

[22] Filed: Oct. 2, 1998

[51] Int. Cl.[7] ..................................................... G08B 13/14
[52] U.S. Cl. ..................................... 340/572.1; 340/572.2; 340/572.4; 340/572.8; 340/825.54; 340/825.36
[58] Field of Search ............................. 340/572.1, 572.2, 340/572.4, 572.8, 573.1, 573.3, 539, 825.54, 686.6, 825.36

[56] References Cited

U.S. PATENT DOCUMENTS

| | | | |
|---|---|---|---|
| 4,068,232 | 1/1978 | Meyers et al. | 343/6.8 R |
| 4,278,977 | 7/1981 | Nossen | 343/6.5 R |
| 4,724,427 | 2/1988 | Carroll | 340/572.1 |
| 4,862,160 | 8/1989 | Ekchian et al. | 340/825.54 |
| 5,528,232 | 6/1996 | Verma et al. | 340/825.54 |
| 5,621,417 | 4/1997 | Hassan et al. | 342/457 |
| 5,726,630 | 3/1998 | Marsh et al. | 340/572.1 |
| 5,742,237 | 4/1998 | Bledsoe | 340/825.49 |
| 5,804,810 | 9/1998 | Woolley et al. | 235/492 |
| 5,825,299 | 10/1998 | Fuentes et al. | 340/825.54 |
| 5,850,187 | 12/1998 | Carrender et al. | 340/825.54 |
| 5,856,788 | 1/1999 | Walter et al. | 340/825.54 |
| 5,883,582 | 3/1999 | Bowers et al. | 340/825.54 |
| 5,936,527 | 8/1999 | Isaacman et al. | 340/572.1 |
| 5,959,568 | 8/1989 | Woolley | 342/42 |

*Primary Examiner*—Daniel J. Wu
*Assistant Examiner*—Toan Pham
*Attorney, Agent, or Firm*—Morgan & Finnegan, L.L.P.

[57] ABSTRACT

Methods and apparata for electronic labeling and localizing an end point and for determining the distance between an interrogator and the end point. In one embodiment, a system is provided that includes an interrogator that transmits an identification code signal that includes a representation of the identification code of the end point to be localized. The interrogator also receives a tag response signal that is transmitted from a tag associated with the end point. The tag transmits the tag response signal upon receiving the identification code signal and confirming that the identification code signal includes a representation of the identification code. The system also includes a localizer, which is hardware, software, or both, that determines the distance between the end point and the interrogator based on the identification code signal and the tag response signal. In one embodiment, the localizer determines the distance based on the time delay between transmitting the identification code signal and receiving the tag response signal. In another alternate embodiment, the localizer determines the distance based on the frequency, or phase, shift between the identification code signal and the tag response signal.

33 Claims, 7 Drawing Sheets

METHOD AND APPARATUS FOR ELECTRONIC LABELING AND LOCALIZING

BACKGROUND OF THE INVENTION

1. Field of the Invention

The present invention relates generally to electronic labeling and localizing, more particularly, to a method and apparatus for electronic labeling and localizing of items whose location may change.

2. Description of Related Art

Numerous methods and systems exist for establishing communication between two end points. While these known methods of communication allow for the transfer of information, they fail to provide an indication of the location of either end point.

Knowledge of an end point's location enhances the performance of communication systems. Specifically, as more and more applications are targeted for wireless communication, the cost of bandwidth will grow and the ability to reuse bandwidth will become necessary. Localizing an end point will allow the efficient reuse of bandwidth.

For example, localization of an end user of a mobile wireless communication system would allow bandwidth to be reused. A cellular system consists of a number of radio base stations connected to a mobile telephone switching office (MTSO). Each base station typically serves a given geographical area, or cell. The MTSO automatically switches connections between base stations as a mobile subscriber moves from one cell to another. In such an arrangement, frequencies allocated for use by one base station in a cell cannot be used by another base station in a neighboring cell because multiple signals at the same frequency would interfere with one another.

If the location of each mobile subscriber is known, however, then each base station would be provided with the information necessary to reuse frequencies and bandwidth. Knowing the locations of a first subscriber and a second subscriber would allow a base station to reuse the frequency allocated to the first subscriber when providing service to the second subscriber located in a different subregion of the same cell. Localization of both subscribers would allow the base station to determine when, based upon the available antenna directivity and signal attenuation, a specific frequency can be reused.

Localization of an end point in a communication system also enhances security. Typically, remote access to confidential information, such as credit card and bank account records and voice mail, is governed by personal identification numbers or other user-specific code. Unfortunately, such code can be lost or stolen, making unauthorized access possible. An unauthorized user merely needs to contact the system, identify the account, and provide the code.

Localization would augment the existing security measures. A user's account would have not only an associated identifying code, but also an associated identifying location from which remote access could be made. An attempt to access account information from an unauthorized location could result in denied access or the invocation of another level of security.

Industries having a large inventory of items would also benefit from the ability to quickly and efficiently localize a given end point. For example, a telecommunications company may have a warehouse of circuit packs, cables, couplers, receivers, and the like. In the past, locating a given circuit pack would entail keeping a record of that circuit pack's physical location in the inventory. Such a record may include information relating to a particular slot, in a particular cabinet, in a particular section of a warehouse. Even if the records are kept as part of an electronic database, this system has several disadvantages.

First, such a system is labor intensive. Each time an article is added to the inventory, its location must be manually noted and the database manually updated. Similarly, each time an article is removed from the inventory, the database must be updated by deleting the record so that no false indication of the item's presence is given. Furthermore, each time an item is moved, such as when making room for other articles in the inventory, its new location must be noted and the database updated. Thus, maintenance of the system is time-consuming.

Second, there is a potential for losing or misplacing an article because no means exists for automatically accounting for movement of the article. If an article in the inventory is moved and the operator fails to record the new location, there is no way for that article to be located. In a warehouse containing thousands of articles, even an exhaustive search of the warehouse would likely prove fruitless. Lost articles increase costs as they consume precious storage space and are, in essence, paid-for inventory that is unavailable for use.

There are systems within the generic class of communication systems that allow an operator to remotely communicate with an article in inventory. One type of system used in communicating with articles in an inventory is known as an Electronic Shelf Labeling (ESL) system. The ESL system comprises a central transmitter, which includes a centralized node for transmitting a modulated signal. The ESL also comprises a plurality of receivers for receiving the modulated signal, each receiver being associated with a different article. In operation, the central transmitter transmits a signal modulated with information particular to one or more given articles. While all articles receive the modulated signal, a demodulator and logic associated with each article allows only those articles identified by the information modulated into the first signal to respond. Those particular articles proceed to receive data from the central transmitter and, in turn, transmit a second signal that indicates to the central transmitter that the data has been received by the articles. The frequency of this acknowledge signal may be changed to a frequency higher than that of the modulated signal so that the central transmitter may better receive the acknowledge signal. By providing each article with a liquid crystal display, the ESL system may be used to display and update price information of items in a grocery store. Thus, although a level of communication is established between the central transmitter and a particular receiver, the ESL fails to provide information necessary to locate the particular receiver or associated article.

Additionally, power constraints would limit the utility of systems capable of communicating with an end point. Specifically, the end point that is to be communicated with typically has a limited power supply. Illustrative of the limitation of power consumption, items may remain in an inventory for years before use. Thus, any localizing system must be efficient and conserve power.

SUMMARY OF THE INVENTION

A system for electronic labeling and localizing according to the present invention satisfies the foregoing needs. In one embodiment, a system is provided that includes an interrogator that transmits an identification code signal that includes a representation of the identification code of the end point to be localized. The interrogator also receives a tag response signal that is transmitted from a tag associated with the end point. The tag transmits the tag response signal upon receiving the identification code signal and confirming that the identification code signal includes a representation of the identification code. The system also includes a localizer, which is hardware, software, or both, that determines the distance between the end point and the interrogator based on the identification code signal and the tag response signal.

In one embodiment, the localizer determines the distance based on the time delay between transmitting the identification code signal and receiving the tag response signal. In another alternate embodiment, the localizer determines the distance based on the frequency, shift between the identification code signal and the tag response signal.

Methods and apparata for localizing an end point and determining the distance between an interrogator and an end point are also provided. One method includes transmitting from an interrogator a first signal, which includes a component identifying the end point, and receiving at the interrogator a second signal from the end point. The second signal comprises a modulated first signal. Lastly, the method includes comparing the received second signal with the first signal to determine the distance between the end point and interrogator.

Another method includes transmitting a first signal from the interrogator. This first signal has a first frequency substantially linear with respect to time. The method further includes the step of receiving at the interrogator a second signal from the end point. Similar to the first signal, the second signal has a second frequency substantially linear with respect to time. In alternate embodiments, the first and second frequencies are either the same or different. The method continues with measuring the time between the interrogator transmitting the first signal and receiving the second signal and determining the distance between the interrogator and the end point based on the measured time, the first frequency, and the second frequency.

DETAILED DESCRIPTION OF PREFERRED EMBODIMENTS

Certain preferred embodiments of the present invention will now be described with reference to the figures. While the following preferred embodiments are directed to use of an electronic labeling and localizing system for inventory control, it is to be understood that the present invention is equally applicable to the labeling and localizing of mobile communication systems within a cell.

Figure 1:
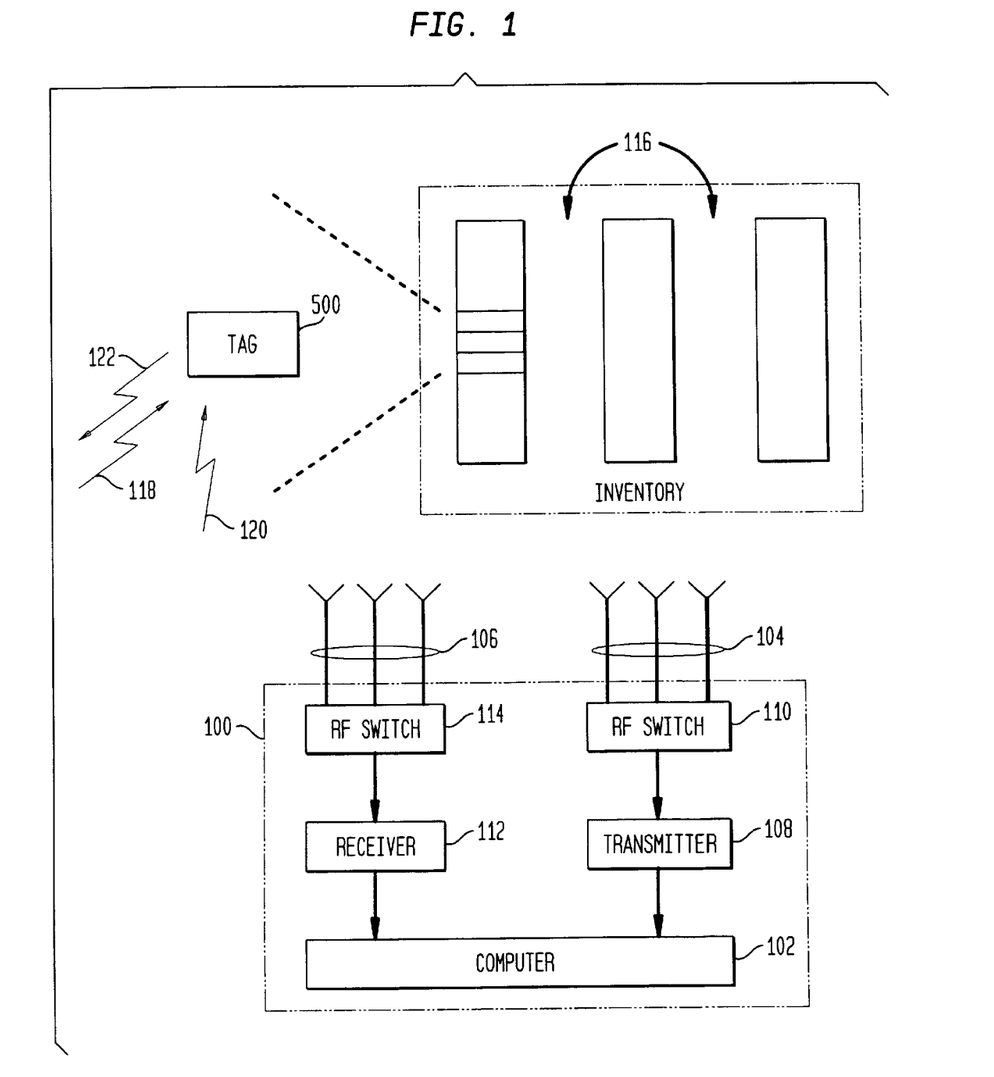
FIG. 1 is an overall schematic view of a system for electronic labeling and localizing items according to one embodiment of the present invention.

Turning first to FIG. 1, an overall schematic of the system for electronic labeling and localizing for use with an inventory of items is shown. In general, the system comprises an interrogator 100 and a plurality of electronic tags 500, each tag 500 being associated with a different item to be localized. The interrogator 100 includes a programmable computer 102, a group of three non-collinear transmitting antennae 104, a group of three non-collinear receiving antennae 106, a transmitter 108 and RF switch 110 interposed between the computer 102 and transmitting antennae 104, and a receiver 112 and RF switch 114 interposed between the receiving antennae 106 and computer 102. An inventory 116 of the items to be labeled and localized are typically stored in slots, in cabinets arranged in rows in a warehouse. Each tag 500 is associated with and located in close proximity to a different item in the inventory 116. Furthermore, each item is assigned an identification code that is stored in its associated tag 500.

As will be discussed in greater detail, the interrogator 100 transmits a wake up signal 118 and an identification (ID) code signal 120, both of which are received by the tags 500. The interrogator 100 also receives a tag response signal 122, which is transmitted from a tag 500. The interrogator 100 performs an analysis of the signals to determine the location of a given item.

The general operation of the system as adapted for use with labeling and localizing items in an inventory will now be discussed with reference to the flow diagram of FIG. 2 and continuing reference to FIG. 1. As shown in step 200, the interrogator 100 transmits the wake-up signal 118. Consequently, in step 202, all tags 500 wake up.

In the present embodiment, the wake up signal 118 comprises a continuous wave having a predetermined frequency. It is preferred that the wake up signal 118 have a frequency in the range of 2.45 GHz because operation at such a frequency, which is within the industry, science and medical (ISM) band, requires no license from the FCC. Depending upon the country of use and relevant regulations, this frequency range could change. As depicted in step 102, all tags 500 receive the wake up signal 118 and, as discussed below, "wake up" or activate certain of their circuitry.

Prior to receiving the wake up signal 118, the tags 500 are in a "SLEEP" state, in which the tags 500 consume little power by having much of the circuitry in an inactive state. Upon receiving the wake up signal 118 and activating their circuitry, the tags 500 are in an "AWAKE" state, in which the tags 500 await transmission of the ID code signal 120 from the interrogator 100.

Next, in step 204, a user selects an identification code that uniquely identifies the item to be localized. This selection may involve manually using a table that correlates the description of the item to be located with its identification code. Alternatively, a code database, which is stored in the computer's memory, is used. A user inputs the description of the item to be located into the computer 102. A search program stored in the computer 102 automatically correlates the description of the item with the identification code of that item by searching fields in the code database. Fields in the code database include: 1) the type of item, 2) the date the item was placed in inventory, 3) the size or calibration of the item, and 4) other miscellaneous information, such as manufacturer, version number, model and/or serial number.

It should be noted that the transmission step 200 may occur after selection of the ID code in step 204. In this order, the tags 500 remain in the SLEEP state longer, thus consuming less power.

Having activated the tags 500 with the wake up signal 118, the interrogator 100 proceeds to transmit the ID code signal 120. This transmission is illustrated as step 206. The ID code signal 120 comprises a carrier wave and a modulating signal containing information representing the idecode cotion code corresponding to the item to be localized. The carrier wave is a signal having a frequency that varies linearly with time from about 2.43 GHz to about 2.47 GHz in a period of about 1 microsecond. Such a signal is commonly known as a "saw tooth", "chirp", or "ramp". The interrogator 100 transmits the ID code signal 120 through one of the antennae 104 coupled to the interrogator 100.

Modulation of the wake up signal 118 with the identification code can be achieved in any number of known manners, such as pulse code modulation (PCM), frequency modulation (FM), or amplitude modulation (AM) phase shift modulation (PM) and others. It is to be understood that the specific modulation scheme chosen will depend on the electromagnetic characteristics of the particular environment.

All tags 500 receive the ID code signal 120 when it is emitted. After receiving the ID code signal 120, in step 208, the tags 500 demodulate the ID code signal 120. The demodulation, of course, corresponds to the manner in which the ID code signal 120 was modulated, as described with respect to step 206. Demodulation allows the information representing the identification code to be separated from the wake up signal 118.

Upon demodulating the signal, each tag 500 will determine whether the identification code of that particular tag 500 matches the identification code modulated in the received ID code signal 120. The determination of whether there has been a match, which is shown in step 120, is performed by a processor in the tag 500 comparing the two values.

As shown in step 212, if a tag 500 determines that there is a match of identification codes, then the tag 500 responds by transmitting a tag response signal 122. Specifically, upon determining that a match exists, the tag 500 proceeds from an "AWAKE" state to a "TRANSMIT" state. The TRANSMIT state is characterized by the activation of additional circuitry of the tag 500 that allows creation and transmission of the tag response signal 122. This additional circuitry, as described in greater detail with respect to FIG. 5, allows the tag 500 to manipulate the received 120 and generate the tag response signal 13.

Because the interrogator 100 continues to transmit the ID code signal 120, the tag 500 is able to manipulate the received ID code signal 120 and generate the tag response signal 122. In this respect, the tags 500 consume little power and can be characterized as passive elements. Of course, in alternate embodiments where power consumption of the tag is of little concern, the tag 500 generates the response signal 122, and the interrogator 100 need not continue to transmit the ID code signal 120.

The manipulations performed on the received ID code signal 120 include doubling its frequency. Accordingly, in the preferred embodiment, the tag response signal 122 is a saw tooth wave whose frequency rises linearly from about 4.86 GHz to 4.94 GHz over a period of approximately 1 microsecond.

It is preferable for the tag 500 to double the frequency of the ID code signal 120 to produce the response signal 122 because it has been found that in the range of 2.45 GHz, there exists greater ambient noise (including that produced by the wake up signal 118 and ID code signal 120) than at 4.90 GHz.

Once the tag response signal 122 is received by the antenna 106 of the interrogator 100, as shown in step 214, the interrogator 100, and particularly the programmable computer 102, uses the signals to calculate the distance from the responding tag 500 to the transmitting antennae 104. As discussed below, determination of the distance is preferably based upon the linearity of the signals.

More specifically, the interrogator 100 doubles the frequency of the ID code signal 120. Thus, because the doubled ID code signal and the tag response signal 122 have linear frequency verses time characteristics, the difference between the instantaneous frequency of the ID code signal 120 and that of the tag response signal 122 as received by the interrogator 100 is proportional to the distance between the transmitting tag 500 and the transmitting antennae 104. The frequency of each of these linear signals is determined by a Fast Fourier Transform performed by the computer 102.

Step 216 represents the step of determining this distance. Where the ID code signal 120 and the tag response signal 122 do not have a perfectly linear frequency verses time function, numerical analysis is performed on the signals to obtain the distance. This numerical analysis, which includes non-linear least squares fit or other delay line methodology, is explained in greater detail below. The non-linear least squares fit is described and applied in "The Structural Investigation of Catalyst by a New Analysis of Their XAS and a More Appropriate Expression of Their EXAFS", 1961, Brian J. McHugh, Yale University. The computer 102 performs this numerical analysis.

As indicated in step 216, the distance is calculated for each of at least three different transmitting antennae 104, storing the resulting distance equation each time in the memory of the computer 102. These steps are repeated at least three times because at least three variables are required to identify the location of a particular tag. Specifically, the first distance equation defines a first sphere on which the responding tag 500 is located. The second distance equation results in another sphere of possible locations which intersects the first sphere along a circle. The third distance equation similarly narrows the location of the responding tag 500 to only two possible points on the circle.

In order to calculate a distance between the responding tag 500 and an antennae 104 when the signals are non-linear, the computer 102 performs a non-linear least squares fit of the product of the received tag response signal 122 and the frequency-doubled ID code signal. Performing this least squares fit allows the interrogator 100 to measure the frequency shift between the received tag response signal 122 and the frequency-doubled ID code signal. This frequency shift is proportional to time delay of the received tag response signal 122. The time delay, in turn, represents a distance between the responding tag 500 and the antennae 104.

The interrogator 100 is able to calculate this distance based on prior calibration of the system involving measuring the time delay associated with a tag 500 placed a known distance away from the antennae 104. Specifically, from the total time delay between the frequency-doubled ID code signal and the received tag response signal 122 the internal tag delay is subtracted. The result represents the propagation delay associated with transmitting the ID code signal 120 from the interrogator 100 to the tag 500 and with transmitting the tag response signal 122 from the tag 500 to the interrogator 100. Thus, the delay is caused by signals traveling twice the distance to the responding tag 500. Consequently, the propagation delay is divided by two so to represent the distance between the tag 500 and the interrogator 100. Moreover, the tag 500 used for calibrating the system is used as the center of the coordinate system discussed herein.

Figure 3:
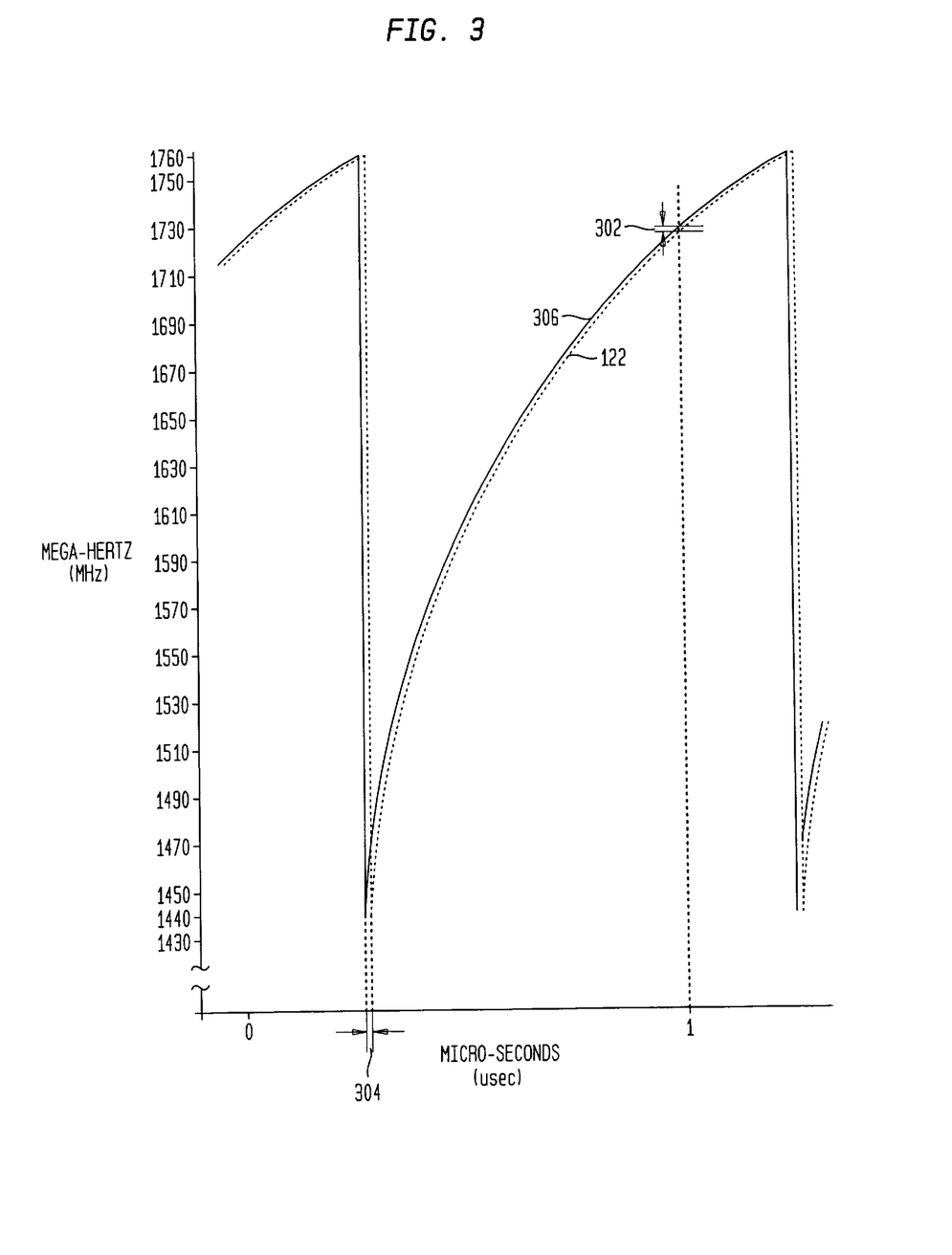
FIG. 3 is a graph representing the frequency versus time characteristics of signals of the system of FIG. 1.

FIG. 3 depicts the relationship between the frequency doubled ID code signal and the tag response signal 122. Specifically, the graph, which shows frequency versus time, illustrates the frequency shift 302 and the time delay 304.

Thus, having repeated the operations represented by steps 206 through 216 for at least three different antennae 104, the programmable computer 102 proceeds, in step 218, to solve the three equations for the three unknowns, namely the x, y and z coordinates of the location of the responding tag 500. Because three distances result in two possible locations for the responding tag 500, the computer 102 is programmed to disregard the one of the two locations, for example, one which would physically fall outside of the warehouse. Therefore, the system uniquely identifies the location of the responding tag 500.

Finally, as represented by step 220, the computer 102 correlates the x, y and z coordinates of the responding tag's 500 location into a slot/shelf/cabinet location. The computer 102 is programmed to compare the x, y, and z coordinates of the tag 500 to a database of all possible shelf locations. This database, which is stored in memory of the computer 102, correlates x, y and z coordinates to a particular slot, in a particular shelf, of given cabinet. Thus, each x, y, and z coordinate corresponds to a unique slot location. As indicated in step 222, the location is displayed to the user on a display screen associated with the computer 102.

A typical display includes at least the description of the item being located, as defined in the code database, and the slot, shelf, cabinet, and aisle location of the item. Preferably, the information is printed in hard copy so that a worker in the warehouse can carry it while retrieving the item. As noted above with reference to step 210, all of the tags 500 receive the ID code signal 120 and determine whether there is a match. If a tag 500 determines that there is not match of its own identification code with that modulated in the ID code signal 120, then the tag 500 proceeds according to step 224. In step 224, each tag 500 that does not have a match and that is in the TRANSMIT state returns to the AWAKE state to conserve power. Thus, the transmission of an ID code signal 120 modulated with an unused or unassigned identification code turns off all tags 500.

After the location information has been displayed to the user in step 222, as well as after a tag 500 has determined in step 224 whether it is in the TRANSMIT state, all tags 500 may return to the SLEEP state. As described in step 226, all tags 500 determine whether any interrogator signal, namely the wake up signal 118 or the ID code signal 120, is being received. If no such signal is being received for a predetermined period of time, then the tags 500 return to the SLEEP state, and the system is ready to localize another item. If such a signal is detected, then the tags 500 remain in the AWAKE state, and await the selection of an ID code signal 120 as indicated in step 204.

While not expected in the ordinary operation of the system, if at any point within the flow of the system a tag 500 determines that no signal is being received, it returns to the SLEEP state. Thus, the system ensures power conservation.

Through experimentation Applicants have found that ambient noise within a warehouse may, in some instances, interfere with the transmission and reception of the above-mentioned signals. Consequently, where such noise exists, it may be preferable to provide multiple sets of three non-collinear antennae within the search environs. For example, a set of three antennae may be provided for each aisle of cabinets in a warehouse. Of course, where multiple sets of antennae are used, the localization process may become prolonged as the interrogator 100 transmits the ID code signal 120 from an increased number of antennae, one at a time, until at least three distances have been determined.

Figure 4:
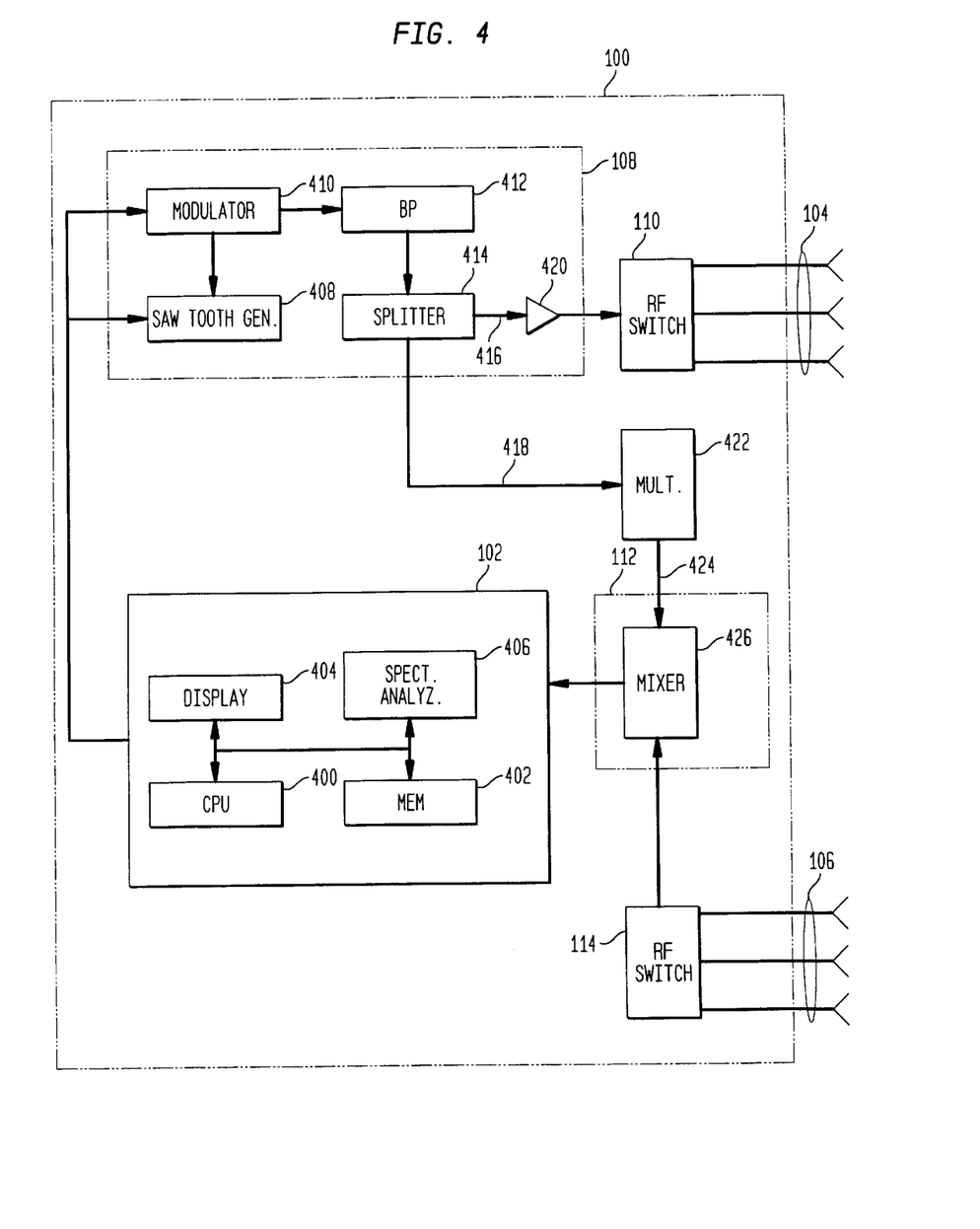
FIG. 4 is a schematic view of the interrogator of the system of FIG. 1.

Having thus described the general operation of the system, the interrogator 100 will now be discussed in greater detail with reference to FIG. 4 and continuing reference to FIGS. 1 and 2. The programmable computer 102, first referenced with respect to FIG. 1, includes a central processing unit (CPU) 400 and associated memory 402. The computer 102 also includes a display screen 404 and a spectrum analyzer 406. The spectrum analyzer 406 comprises either hardwood controlled by the CPU 400, such as the HEWLETT-PACKARD model 8595E spectrum analyzer or the CPU 400 programmed to perform a Fast Fourier Transform on the received signal. The CPU 400 and memory 402 are coupled to the source 400 for controlling the wave generator 403 and the modulator 420. The source 400 also includes a bandpass filter 412 having a bandwidth of 400 MHz centered around 2.45 GHz, the desired frequency characteristics of the wake up signal 118 and ID code signal 120. In response to signals from the CPU 102, the wave generator 408 produces the wake up signal 118. When operating according to step 200 of FIG. 2, the wake up signal 118 passes through the bandpass filter 430 essentially unchanged.

Figure 2:
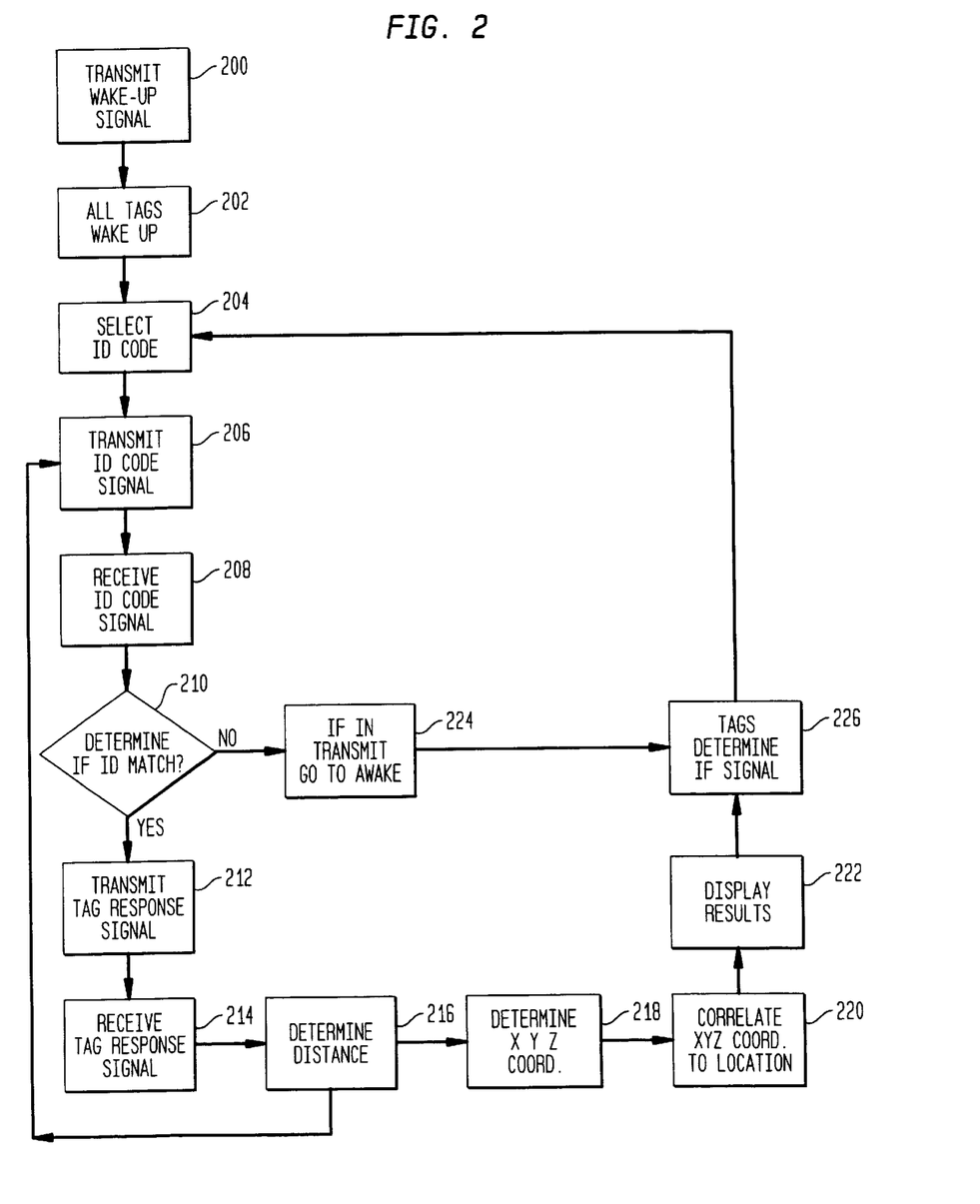
FIG. 2 is a flow diagram of the operation of system of FIG. 1.

When operating according to step 206 of FIG. 2, namely when transmitting the ID code signal 120, the output: of the wave generator 408 is a saw tooth, which acts as a carrier signal. The computer 102 generates the modulating signal, which represents the identification code of the item to be located. The computer 102 controls a modulator 410 to modulate the carrier signal with the modulating signal in the prescribed manner. In an alternate embodiment, the computer 102, receives the ID code signal 120 through an A/D converted and, in accordance with a program stored in memory 402, modulates the signal. In further alternate embodiments, the wave generator 408 includes a separate generator for each of the wake up 118 and ID code 120 signals.

Before the ID code signal 120 is transmitted in step 206 of FIG. 2, the ID code signal 120 is split. After the ID This is accomplished through a common power splitter 414, whose two output components 416, 418 have the same frequency characteristics as the input. The first output component 416 of the power splitter 414 is transmitted, as described in step 206 of FIG. 2, from a single one of the antennae 104. Preferably, the modulated ID code signal 120 first passes through a typical amplifier 420 before being so emitted. From the amplifier 420, the signal passes through the switch 110 and is transmitted via a antennae 104.

The second output component 418 of the splitter 414 enters a frequency multiplier 422. The frequency multiplier 422 doubles the frequency of the second component 418. Thus, the output 424 of the frequency multiplier 422 is a signal centered around a frequency of 4.90 GHz. The output 424 is thus the frequency-doubled ID code signal.

The output of the frequency multiplier 422 is one input to a mixer 426. The second input to the mixer 426, as noted with respect to steps 214 and 216 of FIG. 2, is the tag response signal 122 received from a tag 500. In general, the mixer 426 allows comparison of the output 424, or the frequency-doubled Id code signal, tag response signal 122.

As described above with reference to step 216 of FIG. 2, the mixer 426 multiplies the output of the frequency multiplier 424, which can be represented as k, $\cos(w_n t)$, by the received tag response signal 122, which can be represented as $k_2 \cos(w_c t+\Theta)$, wherein $k_1$ and $k_2$ are constants. As indicated, the received tag response signal 122 has a shift in phase, $\Theta$, as compared to the output of the frequency multiplier 424. The shift, $\Theta$, is represented by reference numeral 302 in FIG. 3. The shift in phase is proportional to the time delay of the ID code signal 120 traveling from the interrogator 100 by a given one of the antennae 104 to the responding tag 500, and the delay of the tag response signal 122 traveling from the responding tag 500 to the interrogator 100. Given the two inputs to the mixer 426, the output can be represented as $\frac{1}{2} k_1 k_2 [\cos\Theta * \cos(2w_c t+\Theta)]$.

In other terms, the numerical analysis involves applying the method of least-squares fit to the sum of the wake up signal 118 whose frequency was doubled by the interrogator 100, and the received tag response signal 122. The received tag response signal 122 is modeled as a function of the known doubled Id code signal. Specifically, where the doubled Id code signal is $k_1 \cos(\chi(t))$, the received tag response signal 122 is $k_1 \cos(b\chi(t-t_d))$, and $t_d$ is a time delay. The time delay, $t_d$, is represented by reference numeral 304 in FIG. 3. Application of the least-squares method results in an equation that can be solved for the time delay. This time delay is proportional to the distance between the transmitting antennae 104 and the responding tag 500. This output, which can be represented as $\frac{1}{2} k_1 k_2 [\cos\{\chi(t)+\chi(t-t_d)\}+\cos\{\chi(t)-\chi(t-t_d)\}]$, is fed to the CPU 102.

As discussed above, the CPU 102 utilizes the output of the mixer 426 as an input to calculate the distance from the responding tag 500 that transmitted the response signal 122 to the given one of the antennae 104 that transmitted the Id code signal 120 according to step 206 of FIG. 2. With at least three distance equations stored in memory, the CPU 102 can proceed to determine the tag's location.

Figure 5:
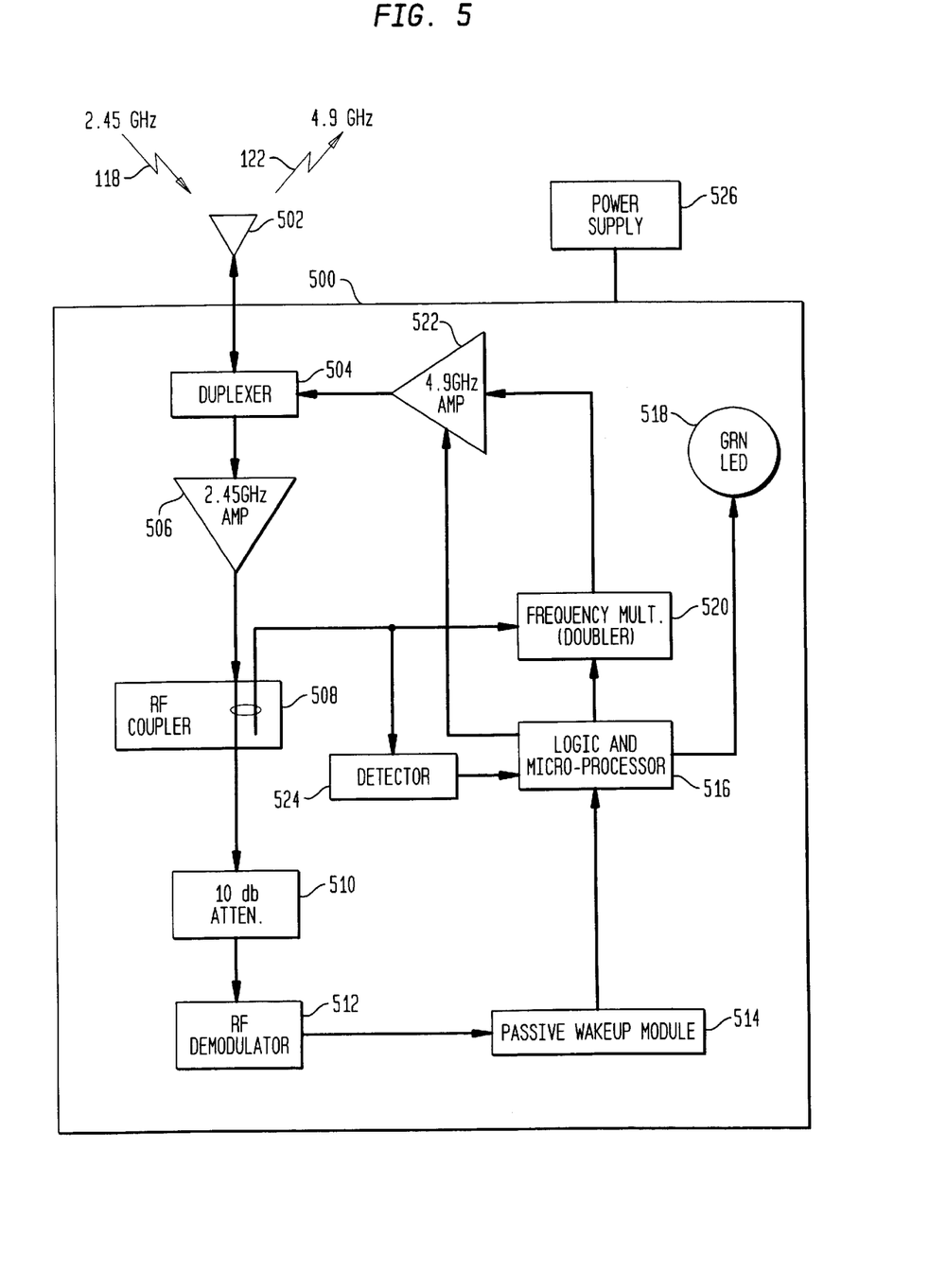
FIG. 5 is a schematic view of a tag of the system of FIG. 1.

An individual tag 500 will now be described in greater detail with reference to FIG. 5 and continuing reference to FIGS. 1 and 2. The tag 500, which can be located nearby, affixed to, or integrally designed within a given item, receives the wake up signal 118 through an antennae 502. The step of receiving the wake up signal 118 is depicted as step 202 in FIG. 2. The received wake up signal 118 then passes to a duplexer 504 and then to an amplifier 506. The amplifier 506 has characteristics suitable for amplifying the received wake up signal 118. In other words, the amplifier 506 should amplify those frequencies passed by the filter 412 of the interrogator transmitter 108, shown in FIG. 4. The amplifier 506 increases the amplitude of the wake up signal 118, whose power had attenuated during transmission, to a suitable level. The exact amount of amplification depends upon the actual signal used and environmental factors such as ambient noise and distance between the interrogator 100 and tags 500.

Having thus been amplified, the signal passes through an RF coupler 508. The RF coupler 508 splits the signal into two components, the first of which travels to an attenuator 510. The attenuator 510 serves to reduce the signal by about 10 db. The use of attenuator 510, though not required, is preferred because it reduces the effect of noise received by the tag 500 so that no signal below a threshold value causes the tag 500 to go from the SLEEP state to the AWAKE state.

After the signal has been attenuated, it is demodulated by demodulator 512. The demodulator 512 corresponds to the modulator 410 of the interrogator 100 so to extract the information representing the identification code from the ID code signal 120. Thus, if FM modulation is employed, the demodulator 512 could comprise, for example, a frequency discriminator such as a balanced discriminator or a zero-crossing detector. When the tag 500 receives the unmodulated wake up signal 118, the output of the demodulator 512 is a DC voltage. The demodulator output is then fed to the passive wake up model 514.

The passive wake up module 514 senses the received wake up signal 118 and causes the tag 500 to go from the SLEEP state to the AWAKE state. The passive wake up module 514 comprises, for example, a capacitor that is charged by the DC power from the demodulator. Having sensed the received wake up signal 7, the output of the wake up module 514 turns on the processor 880.

Similarly, the passive wake up module 514 also provides the logic for returning the tag 500 to the SLEEP state when, as described with reference to step 226 of FIG. 2, no signal is received for a predetermined interval.

The processor 516 performs the task described with reference to step 302 of FIG. 2, namely whether there is a match. More specifically, the processor 516 compares the modulated identification code of the item whose location is being sought with the identification code of the particular item within which the processor 516 resides. Preferably, the processor 516 has associated memory, such as an EPROM, for selectively storing the identification code. Alternatively, the processor 516 could have associated therewith settable DIP switches for selectively providing the identification code. The processor 516 receives the identification code from a detector 524, which demodulates the ID code signal 120 to obtain the ID code. When the processor 516 determines that there is no match, the processor returns the tag 500 to the AWAKE state, if previously transmitting (step 224 of FIG. 2.) On the other hand, when the processor 516 determines that there is a match, the processor 516 turns on the frequency multiplier 520 and the amplifier 900. Thus, the tag 500 is now in the TRANSMIT state. In an alternate embodiment, the functionality of the Processor 516 is provided in logic circuitry.

In a preferred embodiment, the processor 516 also turns on a green light emitting diode (LED) 518 when there is a match. The green LED thus serves as a visible indicator to a user retrieving the localized item.

The frequency multiplier 520 receives as an input a second component of the received signal from the RF coupler 508. As noted with respect to step 220 of FIG. 2, the frequency multiplier 520 doubles the frequency of the received signal. Thus, after the interrogator 100 has transmitted the ID code signal 120 that caused the tag 500 to enter the TRANSMIT state, the frequency multiplier 520 doubles the received wake up signal 118 and outputs a signal centered at 4.90 GHz.

Before being transmitted, the output of the frequency multiplier 520 is amplified by a second amplifier 522. The amplifier 522, which is also turned on by the processor 516, increases the power of signals centered around 4.90 GHz. The amplified 4.90 GHz signal, namely, the tag response signal 122 discussed with reference to step 212 of FIG. 2, is then fed to the duplexer 504 and transmitted via the antenna 502. Alternatively, the tag response signal 122 is transmitted via a second tag antenna, thereby eliminating the need for the duplexer 504.

In order to operate, the tag 500 requires a power source 526. The power source 526 could be a separate battery or photosensitive cell, or the same power source integral with the item associated with the tag 500. The power source 526 is coupled to the amplifiers 506 and 522, the wake up module 514, the processor 516 and the frequency multiplier 520.

In operation, the above-described electronic labeling and localizing system can be employed to perform an office cycle count, checking for the presence of each item in the inventory 116 or in any subset of the inventory 116.

Figure 6:
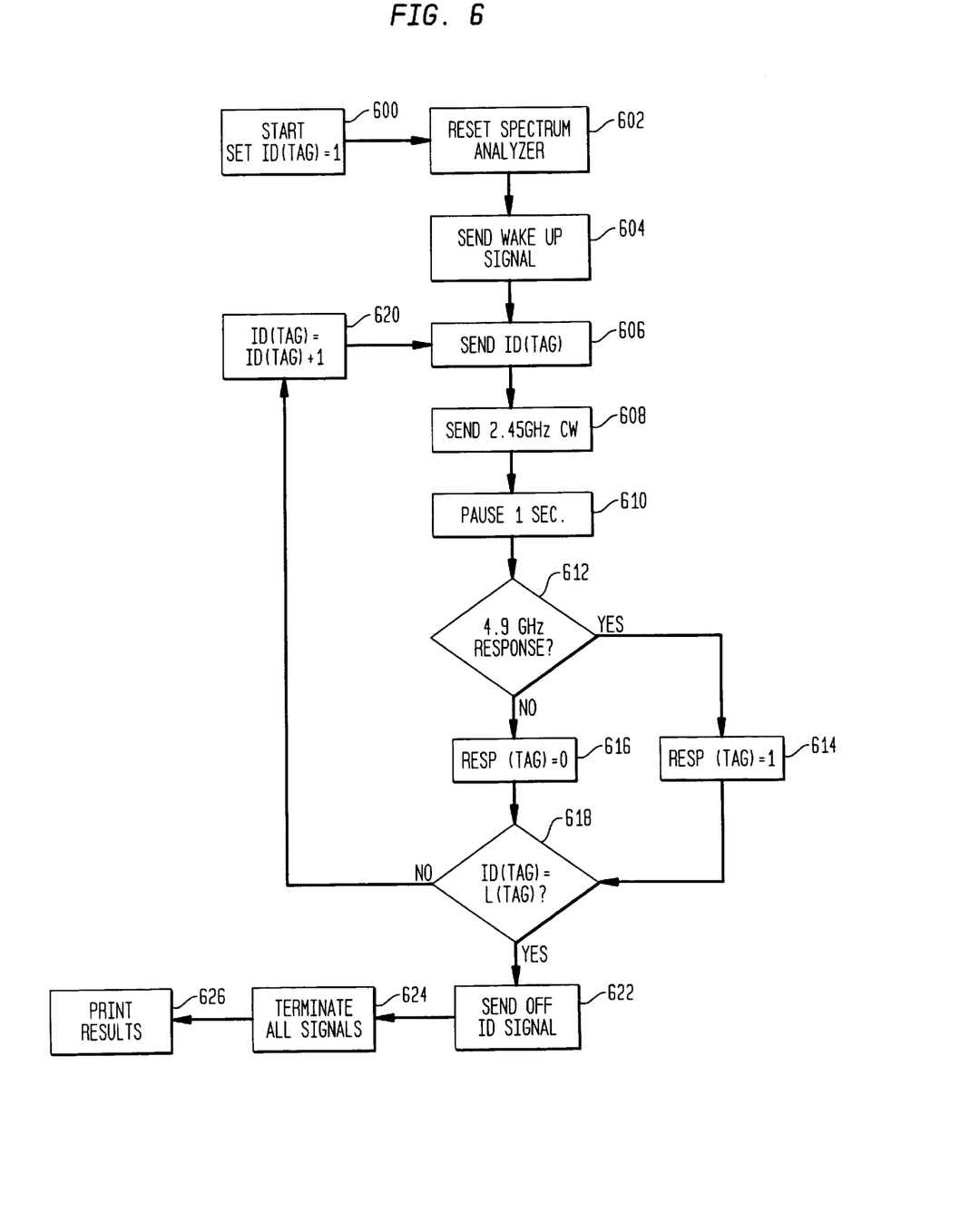
FIG. 6 is a flow diagram of software that performs an office cycle count according to one embodiment of the present invention.

Thus, the office cycle count program will be described with reference to FIG. 6 and continuing reference to FIGS. 4 and 5. As used herein, ID(TAG) represents the identification code of a given tag 500, RESP(TAG) will represent the response for a given tag 500. Where RESP(TAG) is zero, no response for that tag is given, and where RESP(TAG) equals 1, a response will have been given. As also used in FIG. 6, L(TAG) represents the last tag number for a given office cycle count. The office cycle count program, which resides in the memory 402 of the computer 102, causes the following operations to occur.

As shown in step 600, the program begins by setting ID(TAG) to 1, the identification code of the first tag to be searched for. Next, in step 602, the CPU 400 resets the spectrum analyzer 340. When reset, the spectrum analyzer 406 is in a state for optimum sensing of the tag response signal 122. For example, it is preferred that the center frequency be 4.90 GHz, the span be 100 MHz, and the resolution bandwidth be 200 KHz.

Once the spectrum analyzer 406 has been reset, the interrogator 100 transmits the wake up signal 118, as shown in step 604. As described above, the tags 500 receive the wake up signal 118 and are in the AWAKE state. With the tags 500 in the AWAKE state, the interrogator 100 transmits the ID code signal 120 modulated with the first identification code (i.e., ID(TAG)=1) in step 606. Preferably, the transmission of the ID code signal 120 occurs for a period sufficient to turn off all tags 500 other than the one being interrogated and then place the interrogated tag 500 in the TRANSMIT state. Automatically, the interrogator 100 continues to send the wake-up signal 118, as described in 608. As described with reference to step 610, the system preferably pauses for a period of one second, thereby insuring that the system does not accidentally read a noise signal rather than an actual tag response signal 122. More specifically, this pause allows a tag 500 in the TRANSMIT state to turn off when the interrogator 100 transmits an ID code signal 120 modulated with the identification code of another tag. Alternatively, an unused identification code could be transmitted between each interrogation, thus ensuring that only one tag 500 is responding and in the TRANSMIT state at a given time.

While all of the tags 500 receive the wake-up signal 118 and ID code signal 120, only the tag 500 associated with ID(TAG) responds with a 4.9 GHz tag response signal 122. As shown in step 612, the interrogator 100, and particularly the spectrum analyzer 406, determines whether there has been a response by the interrogated tag 500. If the spectrum analyzer 406 senses the tag response signal 122, it communicates to the CPU 400 to set RESP(TAG) equal to one. This operation is represented by step 614. If the spectrum analyzer 406 does not detect the tag response signal 122, it instructs the CPU 400 to set RESP(TAG) equal to zero. The value of RESP(TAG) is stored in memory 320.

After RESP(TAG) has been set, the CPU 400 determines whether ID(TAG) equals L(TAG). In other words, the CPU 400 determines whether the interrogated tag is the last tag to be interrogated. This is depicted in steps 618. If the CPU 400 determines that the interrogated tag is not the last tag to be interrogated, then the CPU 400 increments ID(TAG) as shown in step 620, and repeats the steps described with reference to steps 606–618 to check for the presence of the next tag 500.

In step 618, if the CPU 400 determines that the interrogated tag is the last tag to be interrogated, i.e., that ID(TAG) equals L(TAG), then the CPU 400 instructs the interrogator 100 to send an ID code signal 122 modulated with an unused identification code, thereby turning all tags 500 off. This operation is depicted as step 622. Once all of the tags 500 are turned off, the system terminates all signals, as illustrated in step 624.

Finally, in step 626 the system displays or prints the results of the office cycle count. Specifically, having saved the RESP(TAG) values, the computer 102 now prints out a listing of the responding and nonresponding tags. Preferably, the system also displays the total number of items present, which equals the total number of tags 500 having RESP(TAG) equal to one, and the total number of missing items, which equal the total number of tags 500 having RESP(TAG) equal to zero. Furthermore, the system displays the date and time of the last office cycle count, the total count expected, and the number of discrepancies between the last office cycle count and the just-concluded office cycle count.

In an alternative embodiment, a calibration tag is used to obtain one of the three distance equations. In general, a calibration tag, comprising the same hardware and performing the same function as the tags associated with the items in inventory, is located at a predetermined location in the warehouse. In operation, the distance between the calibration tag and a given antenna is determined in the same manner as described above for the other tags. In doing so, the calibration tag, like the other tags, has a unique identification code. Then, as described above, the distance between the item to be localized and that same antenna is determined.

Having determined the distance between the antenna and the calibration tag and the distance between the antenna and the item to be localized, the interrogator 100, by means of the programmed computer 102, calculates the distance between the calibration tag and the item to be localized. Because the position of the calibration tag is known, the distance from the calibration tag provides an equation representative of the location of the item to be localized. In other words, the equation based on the location of the calibration tag is equivalent to one of the antenna-to-tag equations obtained in step 216 of FIG. 2.

Furthermore, the equation representing the distance from the calibration tag to the tag being localized is used by the interrogator 100 in the same manner as the distance equation of steps 216 and 218 to obtain the exact location of the tag being localized. The other two equations necessary for determining the location of the tag may represent distance to two antenna or include a distance to another calibration tag.

In general, the calibration tag provides a fixed reference point. By doing so, the system is able to calculate a distance equation, as described with reference to steps 216 and 218 of FIG. 2, with less dependency upon the accuracy of the system. More specifically, rather than relying upon the exact distance between an antenna and the tag being localized, the system need only be concerned with the relative distance between the calibration tag and the tag being localized.

As noted above, the present invention, although described with reference to localizing items in an inventory, is equally applicable to other applications. For example, in an alternate embodiment, the present invention is adapted to localize a wireless communication device, such as a cellular telephone or "cellphone." As noted above, knowing the relative location of one cellphone to another would allow bandwidth to be reused.

The approximate location of a cellphone within a given cell can be determined by the same general hardware of and in much the same way as the embodiment for localization of an item in inventory. In some respects, however, the location of a cellphone is simpler to determine. For example, the location of the cellphone can be defined by two rather than three coordinates; the vertical or Z-axis typically is irrelevant. Additionally, there is no need to distinguish between a SLEEP state and an AWAKE state. The tag associated with the cellphone is automatically turned on when the cellphone is turned on and turned off when the telephone is turned off. Such simplification is possible because the location of the telephone is only relevant when it is switched on.

Furthermore, existing directional or "smart" antennae can be used to aid in the localization of the cellphone. A directional antenna transmits signals and receives signals only within a limited angle from the antenna, for example 120°. Accordingly, it is possible that only one or two distance readings would be required to sufficiently localize a cellphone tag. Specifically, without directional antennae, a first distance reading identifies a circle on which the tag is located. A second distance reading identifies a second circle on which the tag is located. The two circles likely intersect at two points, representing two possible locations for the tag. However, with directional antennae, one of the two possible locations could be ruled out as not being within the effective angle of operation of one of the antennae. Additionally, one of the positions could be discounted as being outside the physical boundaries of the cell.

Figure 7:
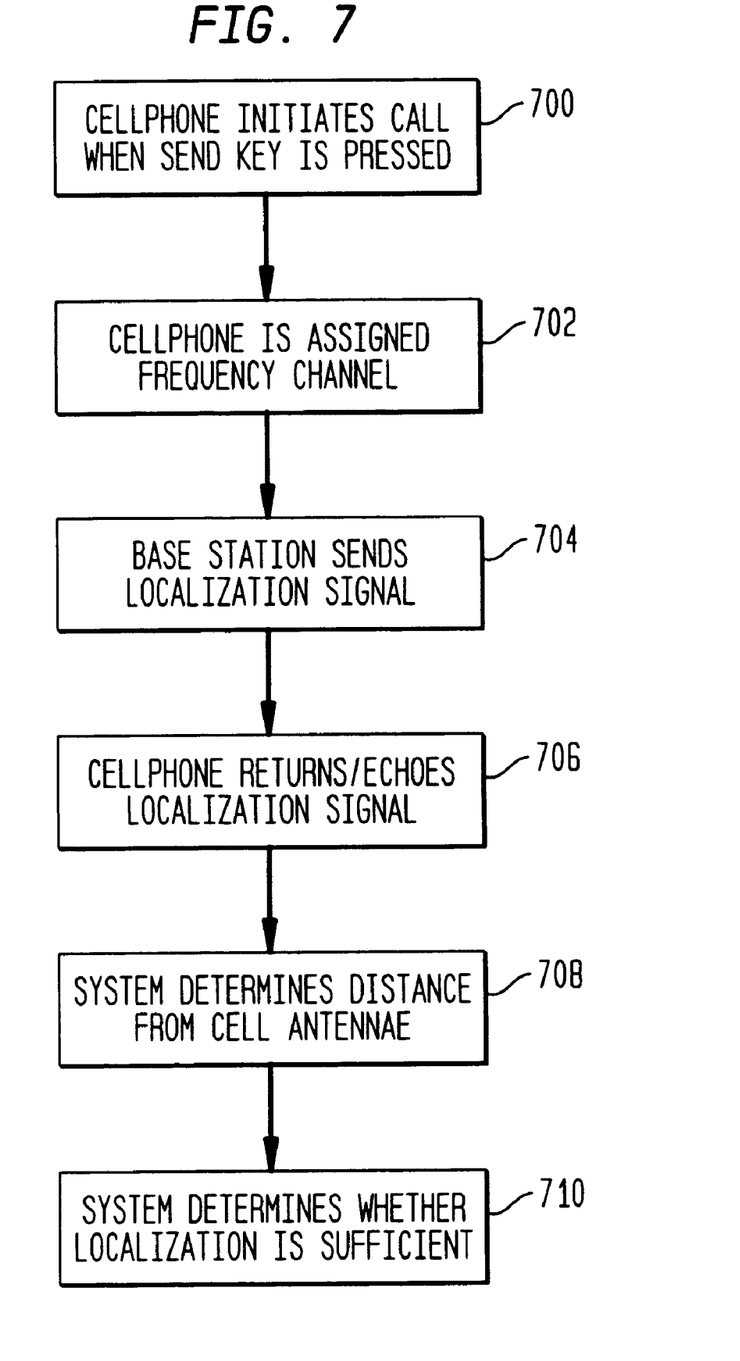
FIG. 7 is a flow diagram of the operation of an alternate embodiment of the present invention.

The operation of such an embodiment will now be described in greater detail with reference to FIG. 1 and continuing reference to FIG. 2. It is to be understood that signals having frequencies other than those described above may be used in this cellphone embodiment. Initially, as shown as step 700, the cellphone initiates a call when the send key is pressed. By doing so, the user manually wakens the internal tag of the cellphone. Thus, step 700 is functionally equivalent to steps 200–210 of FIG. 2.

Having pressed the send key, the cellphone initiates a typical call request/set up process and is assigned a particular frequency channel according to the normal frequency channel assignment process of cellular telephony systems. Accordingly, as shown in step 702, the cellphone is on a particular frequency channel for the particular cell.

As shown in step 704, a localization signal is added to the initial call request/setup process. Specifically, the base station associated with the cell sends a localization signal to the cellphone. In this regard, the cellphone's assigned ten digit telephone number functions as the unique tag ID number. This localization signal may be modulated or multiplexed in any of a known number of manners with the cellphone signal. Thus, step 704 is the functional equivalent of step 212 of FIG. 2.

Once the cellphone receives the localization signal, it returns the localization signal with a tag response signal. This step, shown in step 706 in FIG. 7, is the functional equivalent of step 214 in FIG. 2.

As in step 216 of FIG. 2, the system determines the distance from the cellphone to an antenna within the cell based upon the returned localization signal, i.e. the tag response signal. Determining the distance is shown in step 708.

As noted above, localization may be sufficient with less that three distance measurements. Thus, in step 710, the system determines whether it has sufficient distance measurements to sufficiently localize the cellphone. If the cellphone is not sufficiently located, then the operation proceeds again with step 704 so that another distance measurement may be determined. On the other hand, if the cellphone is sufficiently localized, then the operation of the system does not proceed again with step 704, but rather assigns a location to the cellphone tag.

Knowing the cellphone location and frequency channel allows bandwidth to be reused. For example, the system may determine that a first cellphone is located at the northernmost edge of the cell. A second cellphone, which is located in an adjacent cell to the south, could likely reuse the same frequency channel of the first cellphone. The location of second cellphone may be determined by the above process, wherein the frequency channel of the second cellphone is switched to that being used by the first cellphone. In an alternative embodiment, the location of the cellphone occurs prior to assigning a frequency channel to the cellphone. In such an embodiment, a localization setup process involving transmitting and responding to a localized signal, occurs prior to the connection of a call.

Although the above embodiments utilize a tag response signal that is a modulated ID code signal, the present invention does not require it. In an alternate embodiment, for example, the tag independently generates the tag response signal rather than modulating the ID code signal. The frequency characteristics of such a tag response signal is also substantially linear with respect to time. Additionally, in such an embodiment, because the tag generates the response signal, the ID code signal need not be transmitted continuously and, in one alternate embodiment, the frequency of the tag response signal is the same as that of the ID code signal.

Although the present invention has been described in terms of certain preferred embodiments, other embodiments that are apparent to those of ordinary skill in the art are also intended to be within the scope of this invention. For example, functions described as being implemented in software may be implemented in hardware and vice versa.

Furthermore, in an alternate embodiment of the type described with reference to FIGS. 1–5, the wake up signal could be a saw tooth wave equal to the carrier signal of the ID code signal. The ID code signal, therefore, only need be a "burst," with the wake up signal continuing to be transmitted thereafter instead of the ID code signal. In yet another alternate embodiment, the ID code signal is modulated with the ID code for only a duration long enough to allow the tag to determine whether a match of ID codes occurs.

Accordingly, the scope of the present invention is intended to be limited only by the claims appended hereto.

What is claimed is:

1. A system for localizing an end point having an identification code associated therewith, the system comprising:

an interrogator means for transmitting an identification code signal that includes a representation of the identification code and receiving a tag response signal;

a tag means associated with the end point for receiving the identification code signal and transmitting the tag response signal upon receiving the identification code signal and confirming that the identification code signal includes a representation of the identification code; and a localizing means for determining a distance between the end point and the interrogator means based on the identification code signal and the tag response signal.

2. The system of claim 1 wherein the tag means includes a modulator means for modulating the identification code signal to create the tag response signal.

3. The system of claim 2 wherein the tag means includes a frequency multiplier.

4. The system of claim 1 wherein the tag response signal has a frequency that varies substantially linearly with time and the localizing means includes means for determining the frequency of the tag response signal when received by the interrogator means and correlating the frequency to the distance between the end point and the interrogator means.

5. The system of claim 4 wherein the localizing means further performs a non-linear least squares fit on a product of the tag response signal and the identification code signal.

6. The system of claim 1 wherein the tag response signal is modulated with a predetermined sequence of information, the localizing means further determining at what point in the sequence the interrogator means receives the tag response signal.

7. The system of claim 1 wherein the interrogator means further transmits a wake up signal prior to transmitting the identification code signal and the tag means further receives the wake up signal and is activated prior to receiving the identification code signal.

8. The system of claim 1 wherein the localizing means determines the distance between the end point and the interrogator means based on a distance time delay between the interrogator means transmitting the identification code signal and the interrogator means receiving the tag response signal.

9. The system of claim 8 wherein the tag means has a tag time delay between receiving the identification code signal and transmitting the tag response signal and localizing means determines the distance between the end point and the interrogator means by subtracting the tag time delay from the distance time delay to obtain a result and dividing the result by two.

10. A system for localizing an end point, comprising:
an interrogator having:
a signal generator having as an output a carrier signal;
a modulator coupled to the signal generator, the modulator selectively modulating the carrier signal with information identifying the end point to create an identification code signal;
a transmitter coupled to the modulator, so that the transmitter may transmit the identification code signal; and
a receiver;
a tag associated with the end point, the tag having:
a tag receiver configured to receive the identification code signal;
a demodulator coupled to the tag receiver, the demodulator having an output representing the information identifying the end point;
a memory device storing a predetermined tag identification code associated with the end point;
a comparitor coupled to the demodulator output and the memory device, the comparitor configured to compare the demodulator output to the predetermined tag identification code to determine whether the information matches the predetermined tag identification code;
a tag modulator coupled to the comparitor, the tag modulator having as an output the tag response signal when the comparitor determines the information matches the predetermined tag identification code; and
a tag transmitter coupled to the tag modulator so that the tag transmitter may transmit the tag response signal; and
a localizer coupled to the interrogator, the localizer having:
a mixer coupled to the identification code signal and the tag response signal, the mixer having a mixer output;
a processor coupled to the mixer, the processor configured to determine the distance from the end point to the interrogator based on the identification code signal and the tag response signal.

11. The system of claim 10 wherein the processor is configured to determine the distance between the end point and the interrogator based on a difference in frequency between the identification code signal and the tag response signal.

12. The system of claim 10 wherein the processor is configured to determine the distance between the end point and the interrogator based on a time delay between the interrogator transmitting the identification code signal and receiving the tag response signal.

13. The system of claim 10 wherein the carrier signal is a continuous wave having a frequency that varies substantially linearly with time, the tag modulator includes a frequency multiplier, and the localizer includes a frequency multiplier having as an input the identification code signal, and wherein the mixer has a mixer output, a first input from the frequency multiplier, and a second input from the receiver.

14. The system of claim 13 wherein the processor is further configured to perform a non-linear least squares fit on the mixer output.

15. The system of claim 10 wherein the carrier signal is a wake up signal, the tag includes a passive wake up module in communication with the tag receiver, and the comparitor so that upon receiving the wake up signal, the passive wake up module activates the comparitor.

16. The system of claim 10 wherein the comparitor includes a tag processor.

17. The system of claim 10 wherein the interrogator further includes at least three non-collinear antennae, one of the antennae being in communication with the transmitter at a given time and wherein the distance is determined between the end point and one of the antennae.

18. The system of claim 17 wherein the localizer determines a first distance between the tag and a first of the antennae, a second distance between the tag and a second of the antennae, and a third distance between the tag and a third of the antennae, the processor further configured to determine a location of the tag based on the first, second and third distances.

19. The system of claim 10 further comprising a calibration tag positioned at a known location.

20. The system of claim 19 wherein the localizer is configured to determine a distance between the calibration tag and the tag.

21. The system of claim 10 wherein the interrogator further comprises a spectrum analyzer coupled to the receiver, the spectrum analyzer measuring an input to the receiver.

22. A method for localizing an end point, comprising the steps of:
(a) transmitting from an interrogator a first signal, the first signal including a component identifying the end point;
(b) receiving at the interrogator a second signal from the end point, the second signal comprising a modulated first signal; and (c) comparing the received second signal with the first signal to determine the distance between the end point and interrogator.

23. The method of claim 22 wherein the step of comparing includes comparing the instantaneous frequencies of the first signal and the second signal.

24. The method of claim 22 wherein the transmitting step occurs at a first time and the receiving step occurs at a second time, and the step of comparing includes comparing the first time to the second time.

25. The method of claim 22 further comprising the steps of:

(d) repeating steps (a), (b) and (c) multiple times, each time transmitting and receiving from a different antennae of the interrogator, thereby determining a distance between each antennae and the end point; and (e) localizing the end point based on the distances.

26. An interrogator for localizing an end point, comprising:

means for transmitting a first signal, the first signal including a component identifying the end point;

means for receiving a second signal from the end point, the second signal comprising a modulated first signal; and means for comparing the received second signal with the first signal to determine the distance between the end point and interrogator.

27. The interrogator of claim 26 wherein the means for comparing compares the instantaneous frequencies of the first signal and the second signal.

28. The interrogator of claim 26 wherein the means for transmitting transmits the first signal at a first time and the means for receiving receives the second signal at a second time, and the means for comparing compares the first time to the second time.

29. The interrogator of claim 26 further comprising:

a plurality of antennae coupled to the means for comparing; and means for localizing the end point based on distances between the interrogator and at least two of the plurality of antennae.

30. A method for determining distance between an interrogator and an end point, comprising the steps of:

(a) transmitting from the interrogator a first signal, the first signal having a first frequency substantially linear with respect to time;

(b) receiving at the interrogator a second signal from the end point, the second signal having a second frequency substantially linear with respect to time;

(c) measuring time between the interrogator transmitting the first signal and receiving the second signal; and (d) determining the distance between the interrogator and the end point based on the measured time, the first frequency, and the second frequency.

31. The method of claim 30 wherein the first frequency is the same as the second frequency.

32. A system for localizing an end point, comprising:

an interrogator having:
 a signal generator having an output signal having a substantially linear frequency verses time graph;
 a transmitter coupled to the generator, so that the transmitter may transmit the output signal; and
 a receiver;

a tag associated with the end point, the tag having:
 a tag receiver configured to receive the output signal;
 a tag modulator coupled to the tag receiver, and
 a tag transmitter coupled to the tag modulator so that the tag transmitter may transmit the tag response signal; and a localizer coupled to the interrogator, the localizer having a processor coupled to the mixer, the processor configured to determine the distance from the end point to the interrogator based on the output signal and the tag response signal.

33. The system of claim 32 wherein the interrogator further includes a modulator coupled to the signal generator, the modulator selectively modulating the carrier signal with information identifying the end point to create an identification code signal, and wherein the tag further includes a memory device storing a predetermined tag identification code associated with the end point, a demodulator coupled to the tag receiver, and a comparitor coupled to the demodulator, the comparitor configured to compare the identifying information to the predetermined tag identification code, wherein the tag transmitter outputs the tag response signal when the comparitor determines the identifying information matches the predetermined tag identification code.

* * * * *